Patented Oct. 9, 1934

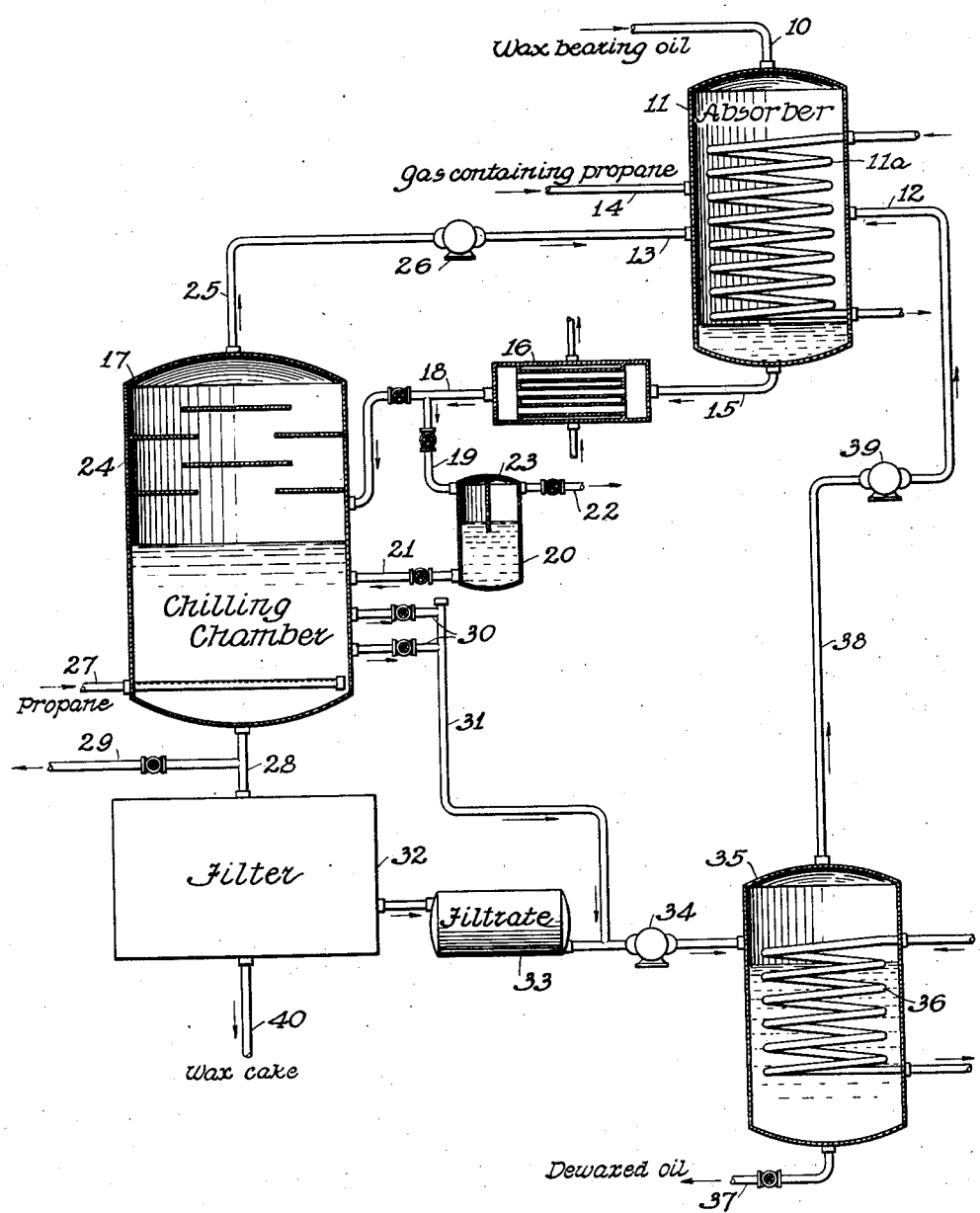

1,976,535

UNITED STATES PATENT OFFICE 1,976,535

SEPARATING WAX FROM OILS

Harold V. Atwell, Bayside, N. Y., assignor to Standard Oil Company, Chicago, Ill., a corporation of Indiana Application March 7, 1932, Serial No. 597,243

7 Claims. (Cl. 196—18)

This invention relates to the separation of wax from oils and it pertains more particularly to the dewaxing of petroleum lubricating oils, this application being a continuation in part of my copending application, Serial 473,644, filed August 7, 1930, and entitled "Separating wax from oils".

Petroleum oils may contain high boiling waxes called petrolatum, and relatively low boiling waxes called paraffin. Petrolatum wax is somewhat amorphous, it cannot ordinarily be easily filtered because it clogs the pores of the filters, and it is usually separated from the oil by settling and decantation. Paraffin wax cannot ordinarily be easily settled because of its pronounced crystalline structure, and it is usually separated from the oil by pressing or filtering. The present trend in petroleum refineries is toward the manufacture of heavy lubricating oil, such as cylinder stock, entirely from distillates. This means that both petrolatum and paraffin wax are present in the same oil and consequently the wax cannot be readily removed by either settling or pressing as heretofore practiced. Furthermore, centrifuging is difficult because the waxes are of approximately the same specific gravity as the oils and because mechanical difficulties are numerous, especially at low temperatures at which separation must be effected. The object of my invention is to provide a means for separating wax from oil whereby the wax may be crystallized in such a medium that it may be readily filtered or settled even though it contains mixtures of paraffin and petrolatum.

A further object is to provide a means for utilizing volatile components of gaseous mixtures, as diluents and/or refrigerants, in a dewaxing system. A further object is to provide a more efficient dewaxing process than has been heretofore known and to minimize the cost of equipment and operation, particularly to avoid the necessity of condensing the diluent or refrigerant prior to reuse. A further object is to obtain wax crystals of desired characteristics by an improved method of handling the mixture of waxy oil and absorbed diluent-refrigerant. Other objects will be apparent as the detailed description of my invention proceeds.

In practicing my invention I prefer to employ a volatile, low boiling hydrocarbon, such as propane, as a diluent and/or refrigerant. Propane vapors from a chill chamber or from the recovery system are absorbed directly in incoming wax-bearing oil, the heat of solution or absorption is removed by a cooling medium, and solution of the wax in the diluted oil is obtained. When the propane is pure, a closed system may be used, but when the propane is supplied in admixture with other gases the propane is preferentially absorbed by oil and the other insoluble fixed gases are separated from the cooled mixture by means of a gas-liquid separation trap. Propane may be used alone as a diluent or refrigerant, or it may supplement ordinary filter naphtha, in which case the filter naphtha may be considered as a part of the oil. The use of propane lowers the viscosity of the mixture (diluted oil) to a remarkable extent, thereby facilitating rapid settling or rapid filtration. The specific gravity of the diluted oil is also lowered, which expedites settling. The growth of wax crystals is profoundly influenced by the presence of liquefied hydrocarbon gases, such as propane, particularly when the wax is allowed to crystallize in the presence of the propane in the manner hereinafter described. An important feature of my invention is the increased filter rate which I am able to obtain by virtue of the peculiar crystalline structure of the wax.

My invention will be more clearly understood from the description of preferred embodiments thereof which are shown in the accompanying drawing, wherein The figure is a diagrammatic elevation, largely in section, illustrating my improved dewaxing system.

The wax-bearing oil is preferably a heavy petroleum lubricating fraction which has been treated with acid to remove asphaltic components. Such an oil may have a viscosity of about 100 seconds Saybolt at 210° F. It should be understood, however, that the invention is equally applicable to any wax-bearing oils, particularly when the wax consists of both paraffin and petrolatum. The wax-bearing oil may be led from any suitable storage tank through pipe 10 to absorber 11. The absorber may be a suitable tower, such as a bubble tower, or the vapors may be contacted with incoming oil in a closed conduit immersed in a suitable cooling fluid.

The volatile hydrocarbon used as a diluent will hereinafter called propane, but it should be understood that I may use any liquefiable hydrocarbon gas or mixture of gases by suitably adjusting the operating temperatures and pressures of my system. Mixtures of propane, propylene and isobutane are preferred because the resulting boiling point approximates dewaxing temperatures at atmospheric pressure. By designing equipment to withstand higher pressures I may use ethane, ethylene, acetylene, etc. By operating under a partial vacuum I may obtain lower temperatures with the more easily liquefied gases, such as butane. It should likewise be understood that I may use other normally gaseous diluents which possess the property of being dissolved or absorbed by the wax-bearing oil or diluted waxy oil and which, in said solution, are effective in producing the desired crystal structure of the wax. The word "propane" in this specification and in the following claims is not to be understood in its strict chemical sense but in the sense hereinabove indicated and refers to a normally gaseous diluent.

Propane from the other parts of the system (hereinafter described) is introduced into the absorber through pipes 12 and 13. Propane from an outside source or gases containing propane may be introduced through pipe 14. In any case, the propane is brought into intimate contact with the wax-bearing oil, which may or may not have been diluted with filter naphtha or other diluents, and the temperature in the absorber is regulated by cooling coil 11A to effect the solution of practically all of the propane in the oil. Preferably the absorber is maintained at about 200 lbs. to 400 lbs. pressure per square inch, and the oil enters at a temperature of about 90-100° F. It is desirable to effect complete solution of the wax in the diluted oil. At the same time it is essential to maintain safe pressure limits and to insure absorption; therefore, I use cooling coil 11A to keep the temperature within the desired range,— usually about 70° to 90° F.

The warm mixture from the absorber is passed by pipe 15 to cooler 16 wherein its temperature is decreased by means of cooling fluid to about 35-40° F. The amount of cooling at this stage will be somewhat dependent upon the amount and the nature of wax present and the cooling should be insufficient to cause any wax to adhere to the surface of the cooler pipes or conduits. The use of a cooler may be dispensed with entirely, but ordinarily cooling by means of water is cheaper than cooling by means of evaporating propane. The cooled liquid may be introduced directly from preliminary cooler 16 to chill chamber 17 by means of valved pipe 18.

If propane is absorbed from other gases I prefer to pass the cooled mixture through pipe 19 and gas-liquid separator trap 20, the liquid and wax being introduced into chill chamber 17 through pipe 21 and the non-absorbed gases being discharged from the system through valved pipe 22. A suitable baffle arrangement 23 may be used to effect separation of liquids from non-absorbed gases, or a bubble tower or other fractionating means may be used for that purpose.

The chill chamber is preferably operated batchwise, continuous operation being effected by the use of a plurality of said chambers, one chamber being filled while another is being cooled, and a third is being emptied. When the chamber is about two-thirds to three-fourths full of a diluted waxy oil mixture, the introduction of further oil is stopped and cooling is effected by the vaporization of a part of the propane by means of a pump. Propane vapors pass between baffles 24 to arrest the entrainment of liquids, then through pipe 25 and compressor 26 to pipe 13, which introduces them back into the absorber. The desired rate of cooling will depend largely upon the amount and nature of the wax present, the amount and nature of the diluent, etc. I have found that about two and one-half parts of diluent to one part of waxy oil gives excellent results. When filter naphtha is used, the amount of propane may be somewhat reduced, and when the evaporation of propane in the chilling chamber produces too viscous a mixture I may introduce further amounts of propane through conduit 27 at the base of chill chamber 17. Preferably, I reduce the temperature of the mixture from about +40° F. to —40° F. in about twenty or thirty minutes, or about 3° to 5° per minute.

The solid wax may be removed from the diluted oil by settling or by filtration. In either case, I may add cellular filter or settling aids, such as diatomaceous earth, etc. These substances may be added in a slurry directly into the chill chamber preferably prior to or during the chill process.

I have discovered that in propane, even petrolatum separates out as fine crystals instead of in the usual amorphous form, and that these crystals settle quite rapidly. Therefore, I may settle the wax crystals and remove them from the base of the chamber through pipes 28 and 29. The rest of the oil may be withdrawn through pipe 31 or through pipe 28, filter 32 and filtrate sump 33. In either case the diluted oil is finally forced by pump 34 into recovery system 35, in which the mixture is heated by suitable steam coils 36 or the like, the dewaxed oil being withdrawn from the base of the system through pipe 37 and the propane being removed through pipe 38. When it is desirable to maintain a relatively low pressure on the recovery system I may use a compressor 39 in this propane line, but the use of such a compressor is not necessary if the recovery system is designed to withstand high pressures.

Instead of settling the wax crystals, they may be all filtered in a closed filter 32, the wax cake being withdrawn through conduit 40 by means of a screw or the like, and the filtrate being passed by way of sump 33 and pump 34, as hereinabove described. The particular structure of the filter forms no part of the present invention and it will therefore not be described in detail. A suitable filter for this type of work is illustrated in U. S. Patent 869,372 to Kelly. Preferably, I employ a vertical filter containing a plurality of bag-like leaves, and I periodically remove the filter cake from the leaves by forcing some of the filtrate through a filter medium in reverse direction or by blowing the filter cake from the leaves by means of propane gas. The use of a large excess of propane makes it possible to obtain very high filter rates and the use of a normally gaseous refrigerant makes it possible to dry the cake on the leaves and remove it from the leaves in a very simple manner. Although I prefer the use of reverse flow of propane in gaseous or liquid form to dislodge filter cakes, it should be understood that I may employ other means to accomplish this purpose. It should also be understood that I may wash the cake any number of times with propane prior or subsequent to its removal from the filter leaf.

It will be noted from the above description that the propane gases are absorbed directly in wax-bearing oil, thereby eliminating the necessity for propane condensers and the necessity of heating the mixture of propane and oil to effect complete wax solution. The absorber is particularly useful in selectively removing propane from the gaseous mixtures, and in such cases the unabsorbed gases are separated from the oil mixture through pipe 22 on trap 20. It should be understood, however, that I may absorb a part of the propane at the relatively high temperature and subsequently add liquefied propane to the mixture, preferably at a very low temperature.

While I have described in detail a preferred embodiment of my invention it should be understood that I do not limit myself to any of the details set forth except as defined by the following claims which should be construed as broadly as the prior art will permit.

I claim:

1. The method of separating wax from oil which comprises contacting a waxy oil with a mixture of gaseous hydrocarbons containing propane at a sufficiently high pressure to effect solution of substantially all of the propane in the oil, trapping out unabsorbed gases from the propane oil solution, cooling the propane solution to effect solidification of wax therein, mechanically removing wax from oil diluted with propane, and removing the propane from the dewaxed oil.

2. The method of separating wax from wax-bearing oil which comprises absorbing a gaseous diluent in the wax-bearing oil under superatmospheric pressure to form a solution containing at least two and one-half parts by volume of diluent to one part of waxy oil, cooling the mixture to effect solidification of the wax, mechanically removing the solidified wax from the diluted oil, and removing the gaseous diluent from the dewaxed oil.

3. The method of separating wax from a wax-bearing oil which comprises contacting said wax-bearing oil with a gaseous diluent at a pressure of about 200 to 400 pounds per square inch, absorbing a sufficient amount of gaseous diluent in said waxy oil at said elevated pressure to give a solution having about two and one-half parts by volume of liquefied gas to one part by volume of waxy oil, cooling the mixture to effect solidification of the wax, mechanically removing the wax from the diluted oil, and removing the diluent from the dewaxed oil.

4. The method of separating wax from wax-bearing oil which comprises contacting a wax-bearing oil with sufficient propane at superatmospheric pressure to cause the absorption of said propane in said oil and to yield a solution containing about two and one-half parts by volume of propane to one of oil, cooling the propane solution to effect solidification of wax therein, mechanically removing wax from the diluted oil, vaporizing the propane from said oil and absorbing said vaporized propane in further amounts of incoming waxy oil.

5. The method of separating wax from oil which comprises contacting a waxy oil with a gas containing propane at superatmospheric pressure, cooling the mixture to effect solution of the propane in the oil, trapping out unabsorbed gases from the propane-oil solution, cooling the propane solution to effect solidification of wax therein, and mechanically separating the wax from the diluted oil.

6. The method of separating wax from a wax-bearing oil which comprises absorbing a sufficient amount of propane in said oil to form a solution containing at least two and one-half volumes of liquefied propane to one volume of oil, cooling the solution to cause solidification of wax, effecting at least a part of the cooling at a rate of about 3° per minute by vaporizing propane from the solution, mechanically separating wax from the diluted oil, vaporizing propane from the dewaxed oil, and re-absorbing said vaporized propane in further amounts of incoming wax-bearing oil.

7. In a system for separating wax from oil, a chill chamber, an absorber, means for withdrawing vapors from said chill chamber and forcing them into said absorber, separate means for introducing vapors into said absorber, means for introducing a waxy oil into said absorber whereby said waxy oil is contacted with said vapors, means for cooling said waxy oil and vapors, means for separating unabsorbed gases from the cooled oil, and means for passing said cooled oil together with absorbed gases to said chill chamber.

HAROLD V. ATWELL.